(12) United States Patent
Lad

(10) Patent No.: US 8,725,688 B2
(45) Date of Patent: May 13, 2014

(54) IMAGE LEVEL COPY OR RESTORE, SUCH AS IMAGE LEVEL RESTORE WITHOUT KNOWLEDGE OF DATA OBJECT METADATA

(75) Inventor: Kamleshkumar K. Lad, Monroe, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 511 days.

(21) Appl. No.: 12/553,145

(22) Filed: Sep. 3, 2009

(65) Prior Publication Data

US 2010/0076932 A1    Mar. 25, 2010

Related U.S. Application Data

(60) Provisional application No. 61/094,763, filed on Sep. 5, 2008.

(51) Int. Cl.
G06F 17/30 (2006.01)
(52) U.S. Cl.
USPC .......................................... 707/639; 707/649
(58) Field of Classification Search
USPC .................................................. 707/639, 649
See application file for complete search history.

(56) References Cited

U.S. PATENT DOCUMENTS

| | | |
|---|---|---|
| 4,464,122 A | 8/1984 | Fuller et al. |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

Quinlan, Sean. "A cached worm file system." Software: Practice and Experience 21.12 (1991): 1289-1299.*

(Continued)

Primary Examiner — Usmaan Saeed
Assistant Examiner — Nan Hutton
(74) Attorney, Agent, or Firm — Perkins Coie LLP

(57) ABSTRACT

A system and method for performing an image level restore of data is described. In some examples, the system receives a request to restore a file and transmits the request to an intermediate component. The intermediate component may then retrieve a directory file from an image of a secondary copy of a data set, identify a location of the file from the directory file, and provide the location to the requestor.

8 Claims, 10 Drawing Sheets

(56) References Cited

U.S. PATENT DOCUMENTS

| | | |
|---|---|---|
| 5,333,315 A | 7/1994 | Saether et al. |
| 5,347,653 A | 9/1994 | Flynn et al. |
| 5,386,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsiao et al. |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,341,287 B1 | 1/2002 | Sziklai et al. |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,675,177 B1 | 1/2004 | Webb |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |
| 6,745,178 B1 | 6/2004 | Emens et al. |
| 6,795,828 B2 | 9/2004 | Ricketts |
| 6,816,941 B1 | 11/2004 | Carlson et al. |
| 6,820,070 B2 | 11/2004 | Goldman et al. |
| 6,839,741 B1 | 1/2005 | Tsai |
| 6,839,803 B1 | 1/2005 | Loh et al. |
| 6,850,994 B2 | 2/2005 | Gabryjelski |
| 6,860,422 B2 | 3/2005 | Hull et al. |
| 6,865,568 B2 | 3/2005 | Chau |
| 6,871,182 B1 | 3/2005 | Winnard et al. |
| 6,892,221 B2 | 5/2005 | Ricart et al. |
| 6,948,038 B2 | 9/2005 | Berkowitz et al. |
| 6,957,186 B1 | 10/2005 | Guheen et al. |
| 6,970,997 B2 | 11/2005 | Shibayama et al. |
| 6,976,039 B2 | 12/2005 | Chefalas et al. |
| 6,995,675 B2 | 2/2006 | Curkendall et al. |
| 6,996,616 B1 | 2/2006 | Leighton et al. |
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad et al. |
| 7,058,661 B2 | 6/2006 | Ciaramitaro et al. |
| 7,099,901 B2 | 8/2006 | Sutoh et al. |
| 7,107,298 B2 | 9/2006 | Prahlad et al. |
| 7,107,416 B2 | 9/2006 | Stuart et al. |
| 7,133,870 B1 | 11/2006 | Tripp et al. |
| 7,139,826 B2 | 11/2006 | Watanabe et al. |
| 7,139,846 B1 | 11/2006 | Rossi |
| 7,146,387 B1 | 12/2006 | Russo et al. |
| 7,155,421 B1 | 12/2006 | Haldar |
| 7,155,481 B2 | 12/2006 | Prahlad et al. |
| 7,159,081 B2 | 1/2007 | Suzuki |
| 7,171,468 B2 | 1/2007 | Yeung et al. |
| 7,171,585 B2 | 1/2007 | Gail et al. |

(56) References Cited

U.S. PATENT DOCUMENTS

| | | |
|---|---|---|
| 7,188,141 B2 | 3/2007 | Novaes |
| 7,240,100 B1 | 7/2007 | Wein et al. |
| 7,246,207 B2 | 7/2007 | Kottomtharayil et al. |
| 7,269,664 B2 | 9/2007 | Hutsch et al. |
| 7,284,033 B2 | 10/2007 | Jhanji |
| 7,287,047 B2 | 10/2007 | Kavuri |
| 7,290,017 B1 | 10/2007 | Wang et al. |
| 7,313,659 B2 | 12/2007 | Suzuki |
| 7,328,325 B1 | 2/2008 | Solis et al. |
| 7,346,623 B2 | 3/2008 | Prahlad et al. |
| 7,346,676 B1 | 3/2008 | Swildens et al. |
| 7,346,751 B2 | 3/2008 | Prahlad et al. |
| 7,376,947 B2 | 5/2008 | Evers |
| 7,379,978 B2 | 5/2008 | Anderson et al. |
| 7,386,535 B1 | 6/2008 | Kalucha et al. |
| 7,395,282 B1 | 7/2008 | Crescenti et al. |
| 7,421,460 B2 | 9/2008 | Chigusa et al. |
| 7,424,543 B2 | 9/2008 | Rice, III |
| 7,434,219 B2 | 10/2008 | De Meno et al. |
| 7,457,790 B2 | 11/2008 | Kochunni et al. |
| 7,472,142 B2 | 12/2008 | Prahlad et al. |
| 7,496,841 B2 | 2/2009 | Hadfield et al. |
| 7,565,484 B2 | 7/2009 | Ghosal et al. |
| 7,577,689 B1 | 8/2009 | Masinter et al. |
| 7,577,694 B2 | 8/2009 | Nakano et al. |
| 7,584,469 B2 | 9/2009 | Mitekura et al. |
| 7,587,715 B1 | 9/2009 | Barrett et al. |
| 7,593,935 B2 | 9/2009 | Sullivan |
| 7,603,626 B2 | 10/2009 | Williams et al. |
| 7,606,844 B2 | 10/2009 | Kottomtharayil |
| 7,610,285 B1 | 10/2009 | Zoellner et al. |
| 7,668,884 B2 | 2/2010 | Prahlad et al. |
| 7,673,175 B2 | 3/2010 | Mora et al. |
| 7,676,542 B2 | 3/2010 | Moser et al. |
| 7,689,899 B2 | 3/2010 | Leymaster et al. |
| 7,730,031 B2 | 6/2010 | Forster |
| 7,734,593 B2 | 6/2010 | Prahlad et al. |
| 7,734,669 B2 | 6/2010 | Kottomtharayil et al. |
| 7,751,628 B1 | 7/2010 | Reisman |
| 7,761,409 B2 | 7/2010 | Stefik et al. |
| 7,792,789 B2 | 9/2010 | Prahlad et al. |
| 7,801,871 B2 | 9/2010 | Gosnell |
| 7,814,118 B2 | 10/2010 | Kottomtharayil et al. |
| 7,827,266 B2 | 11/2010 | Gupta |
| 7,831,793 B2 | 11/2010 | Chakravarty et al. |
| 7,840,537 B2 | 11/2010 | Gokhale et al. |
| 7,844,676 B2 | 11/2010 | Prahlad et al. |
| 7,865,517 B2 | 1/2011 | Prahlad et al. |
| 7,882,077 B2 | 2/2011 | Gokhale et al. |
| 7,882,093 B2 | 2/2011 | Kottomtharayil et al. |
| 7,937,393 B2 | 5/2011 | Prahlad et al. |
| 7,937,420 B2 | 5/2011 | Tabellion et al. |
| 7,937,702 B2 | 5/2011 | De Meno et al. |
| 7,984,063 B2 | 7/2011 | Kottomtharayil et al. |
| 8,037,028 B2 | 10/2011 | Prahlad et al. |
| 8,055,627 B2 | 11/2011 | Prahlad et al. |
| 8,060,514 B2 | 11/2011 | Arrouye et al. |
| 8,099,428 B2 | 1/2012 | Kottomtharayil et al. |
| 8,108,427 B2 | 1/2012 | Prahlad et al. |
| 8,140,786 B2 | 3/2012 | Bunte et al. |
| 8,161,003 B2 | 4/2012 | Kavuri |
| 8,229,954 B2 | 7/2012 | Kottomtharayil et al. |
| 2002/0032878 A1 | 3/2002 | Karpf |
| 2002/0049883 A1 | 4/2002 | Schneider et al. |
| 2002/0120858 A1 | 8/2002 | Porter et al. |
| 2003/0046313 A1 | 3/2003 | Leung et al. |
| 2003/0050979 A1 | 3/2003 | Takahashi |
| 2003/0101086 A1 | 5/2003 | San Miguel |
| 2004/0039689 A1 | 2/2004 | Penney et al. |
| 2004/0267815 A1 | 12/2004 | De Mes |
| 2005/0039069 A1 | 2/2005 | Prahlad et al. |
| 2005/0097070 A1 | 5/2005 | Enis et al. |
| 2005/0216788 A1* | 9/2005 | Mani-Meitav et al. ............ 714/6 |
| 2005/0251786 A1 | 11/2005 | Citron et al. |
| 2005/0278207 A1 | 12/2005 | Ronnewinkel |
| 2006/0036619 A1 | 2/2006 | Fuerst et al. |
| 2006/0070061 A1 | 3/2006 | Cox et al. |
| 2006/0115802 A1 | 6/2006 | Reynolds |
| 2006/0116999 A1 | 6/2006 | Dettinger et al. |
| 2006/0149604 A1 | 7/2006 | Miller |
| 2006/0149724 A1 | 7/2006 | Ritter et al. |
| 2006/0224846 A1 | 10/2006 | Amarendran et al. |
| 2006/0282900 A1 | 12/2006 | Johnson et al. |
| 2007/0022145 A1 | 1/2007 | Kavuri |
| 2007/0028229 A1 | 2/2007 | Knatcher |
| 2007/0043715 A1 | 2/2007 | Kaushik et al. |
| 2007/0061266 A1 | 3/2007 | Moore et al. |
| 2007/0061298 A1 | 3/2007 | Wilson et al. |
| 2007/0136541 A1 | 6/2007 | Herz et al. |
| 2007/0166674 A1 | 7/2007 | Kochunni et al. |
| 2007/0214330 A1 | 9/2007 | Minami et al. |
| 2007/0226320 A1* | 9/2007 | Hager et al. ............ 709/219 |
| 2007/0250810 A1 | 10/2007 | Tittizer et al. |
| 2007/0296258 A1 | 12/2007 | Calvert et al. |
| 2008/0282048 A1 | 11/2008 | Miura |
| 2008/0288947 A1 | 11/2008 | Gokhale et al. |
| 2008/0288948 A1 | 11/2008 | Attarde et al. |
| 2008/0320319 A1 | 12/2008 | Muller et al. |
| 2009/0171883 A1 | 7/2009 | Kochunni et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320033 A1 | 12/2009 | Gokhale et al. |
| 2009/0320037 A1 | 12/2009 | Gokhale et al. |
| 2010/0031017 A1 | 2/2010 | Gokhale et al. |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0070726 A1 | 3/2010 | Ngo et al. |
| 2010/0114837 A1 | 5/2010 | Prahlad et al. |
| 2011/0093471 A1 | 4/2011 | Brockway et al. |
| 2011/0138225 A1 | 6/2011 | Gunabalasubramaniam et al. |
| 2011/0173171 A1 | 7/2011 | De Meno et al. |
| 2012/0036108 A1 | 2/2012 | Prahlad et al. |
| 2013/0145376 A1 | 6/2013 | Gokhale et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0910019 | 4/1999 |
| EP | 0981090 A1 | 2/2000 |
| EP | 0986011 | 3/2000 |
| EP | 1035690 | 9/2000 |
| GB | 2216368 A | 10/1989 |
| JP | 07-046271 A | 2/1995 |
| JP | 7073080 A | 3/1995 |
| JP | 8044598 A | 2/1996 |
| JP | 2000035969 | 2/2000 |
| JP | 2003531435 | 10/2003 |
| WO | WO-9513580 A1 | 5/1995 |
| WO | WO-9912098 A1 | 3/1999 |
| WO | WO-00/58865 | 10/2000 |
| WO | WO-0106368 A1 | 1/2001 |
| WO | WO-01/16693 | 3/2001 |
| WO | WO-0180005 | 10/2001 |

OTHER PUBLICATIONS

Hutchinson, Norman C., et al. "Logical vs. physical file system backup." OSDI. vol. 99. 1999.*

Wu, Chin-Hsien, Tei-Wei Kuo, and Li-Pin Chang. "Efficient initialization and crash recovery for log-based file systems over flash memory." Proceedings of the 2006 ACM symposium on Applied computing. ACM, 2006.*

Matthews, Jeanna, et al. "Data protection and rapid recovery from attack with a virtual private file server and virtual machine appliances." Proceedings of the IASTED International Conference on Communication, Network and Information Security (CNIS 2005). 2005.*

Armstead et al., "Implementation of a Campus-wide Distributed Mass Storage Service: The Dream vs. Reality," *IEEE*, 1995, pp. 190-199.

(56) References Cited

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," *IEEE*, 1994, pp. 124-126.
Jander, M., "Launching Storage-Area Net," *Data Communications*, US, McGraw Hill, NY, vol. 27, No. 4 (Mar. 21, 1998), pp. 64-72.
Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).
Rosenblum et al., "The Design and Implementation of a Log-Structured File System," *Operating Systems Review SIGOPS*, vol. 25, No. 5, New York, US, pp. 1-15 (May 1991).
U.S. Appl. No. 13/538,290, filed Jun. 29, 2012, Kottomtharayil.
PCT International Search Report for International Application No. PCT/US09/32325, date of mailing Mar. 17, 2009, 11 pages.
Hennessy et al., "Computer Architecture—A Quantitative Approach", 2nd Edition, 1996, pp. 246-250.
Microsoft Press Computer Dictionary Third Edition, "Data Compression," Microsoft Press, 1997, p. 130.
Pitoura et al., "Locating Objects in Mobile Computing", IEEE Transactions on Knowledge amd Data Engineering, vol. 13, No. 4, Jul./Aug. 2001, pp. 571-592.
Rowe et al., "Indexes for User Access to Large Video Databases", Storage and Retrieval for Image and Video Databases II, IS,& T/SPIE Symp. on Elec. Imaging Sci. & Tech., Feb. 1994, pp. 1-12.
U.S. Appl. No. 09/609,977, filed Jul. 5, 2000, Inventor(s) A. Prahlad et al., 55 pages.
U.S. Appl. No. 13/076,792, filed Mar. 31, 2011, Inventor(s) P. Kumarasamy et al., 37 pages.
U.S. Appl. No. 13/538,290, filed Jun. 29, 2012, Inventor(s) R. Kottomtharayil., 39 pages.
Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.
U.S. Appl. No. 13/801,625, filed Mar. 13, 2013, Yongtao et al.
Extended European Search Report for Application No. EP 09767119, Mail date Feb. 11, 2013, 12 pages.

* cited by examiner

IMAGE LEVEL COPY OR RESTORE, SUCH AS IMAGE LEVEL RESTORE WITHOUT KNOWLEDGE OF DATA OBJECT METADATA

CROSS REFERENCE TO RELATED APPLICATIONS

This application claims priority to U.S. Provisional Patent Application No. 61/094,763, filed on Sep. 5, 2008, entitled IMAGE LEVEL COPY OR RESTORE, SUCH AS IMAGE LEVEL RESTORE WITHOUT KNOWLEDGE OF DATA OBJECT METADATA, which is incorporated by reference in its entirety.

BACKGROUND

A snapshot is a copy of a set of files and/or directories as they were at a particular point in the past. That is, the snapshot is an image, or representation, of a volume of data at a point in time. A snapshot may be as a secondary copy of a primary volume of data, such as data in a file system, an Exchange server, a SQL database, an Oracle database, and so on. The snapshot may be an image of files, folders, directories, and other data objects within a volume, or an image of the blocks of the volume.

Data storage systems utilize snapshots for a variety of reasons. One typical use of snapshots is to copy a volume of data without disabling access to the volume for a long period. After performing the snapshot, the data storage system can then copy the data set by leveraging the snapshot of the data set. Thus, the data storage system performs a full backup of a primary volume when a primary volume is active and generating real-time data. Although performing a snapshot (i.e., taking an image of the data set) is a fast process, the snapshot is typically not an effective or reliable backup copy of a data set, because it does not actually contain the content of the data set. Restoring data from snapshots can be especially cumbersome, because a restoration process cannot restore the data set using snapshots alone. Recovery of individual files or folders can be especially cumbersome, because typical systems often recover an entire snapshot in order to restore an individual file or folder imaged by the snapshot.

Associated information, such as metadata, is often required in order to restore a file or folder via the snapshot, because the snapshot itself does not provide any information about the file or folder other than the image of a data set at a certain time. That is, the snapshot provides information about what was in or is changed in a data set (the image), but does not provide any information about where a particular file (or a copy of a data object) is currently stored or contained.

Therefore, a system that provides the benefits of snapshots while avoiding some of the drawbacks would provide significant utility.

DETAILED DESCRIPTION

Overview

Figure 1:
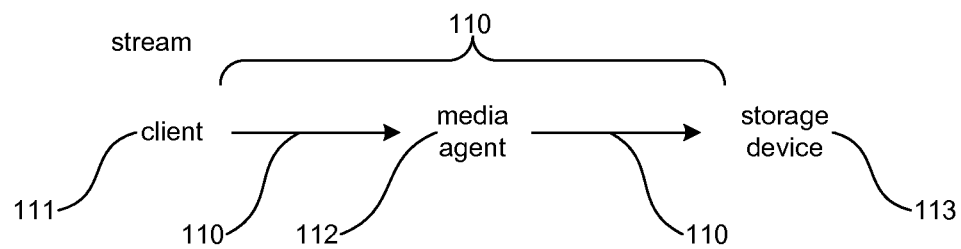
FIG. 1 is a block diagram illustrating components of a data stream utilized by a suitable data storage system.

Described in detail herein is a system and method that restores desired data via snapshot images of the data by retrieving a directory file from the snapshots, using the directory file to identify a location of where the data is stored, and providing the location to a requestor of the data (such as a data recovery system, a user, and so on). That is, the system may restore data from an image level copy of the data without generally relying on metadata or other similar information associated with the data.

In some examples, the system includes an intermediate component communicating between a data recovery system and a secondary copy of data to be restored, such as a snapshot copy mounted to the intermediate component. The snapshot copy may be a software-based snapshot (such as a snapshot performed using File System Snapshot, Qsnap, Volume Shadow Services, and so on), or a hardware-based snapshot (such as a snapshot performed using EMC, HP, Hitachi, and/or NetApp or other applications). For example, the snapshot copy may be created during a copy-on-write process, a redirect-on-write process, a split mirror process, using a log structure file architecture, using continuous data protection, and so on. The intermediate component may receive a request from the data recovery system to restore a file, locate a snapshot that contains an image of the file, retrieve, from the snapshot, a directory file imaged by the snapshot, identify a location for the file from the directory file, and indicate the location for the file to the data recovery system. The data recovery system can then retrieve the requested file using the location information.

In some examples, the system includes a cache or other memory component that stores retrieved files, directory files, and other data once the data is requested and/or retrieved during a restoration process. Before identifying a snapshot that images the file, the system may review the cache after receiving a request to restore a file. In some cases, the system may identify a directory file associated with the file, and extract the location information directly from the cached directory file. In some cases, the system may restore the file directly from the cache.

Thus, in some examples, the system utilizes an intermediate component to facilitate the extraction of information from imaged directory files that identify locations of files within imaged data sets. Knowledge or extraction of location information enables a recovery system to avoid relying on metadata and/or other indexed information associated with a data set and/or a snapshot of a data set. Additionally, in some examples the system enables a snapshot-based copy of data to act as a file system for all data imaged by the copy of data.

The system will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram illustrating components of a data stream utilized by a suitable data storage and recovery system is shown. The stream 110 may include a client 111, a media agent 112, and a secondary storage device 113. For example, in storage operations, the system may store, receive and/or prepare data to be stored, copied or backed up at a server or client 111. The system may then transfer the data to be stored to media agent 112, which may then refer to storage policies, schedule policies, and/retention policies (and other policies) to choose a secondary storage device 113. The media agent 112 may include or be associated with an intermediate component, to be discussed herein.

The secondary storage device 113 receives the data from the media agent 112 and stores the data as a secondary copy, such as a backup copy. Secondary storage devices may be magnetic tapes, optical disks, USB and other similar media, disk and tape drives, and so on. Of course, the system may employ other configurations of stream components not shown in the Figure.

Figure 2:
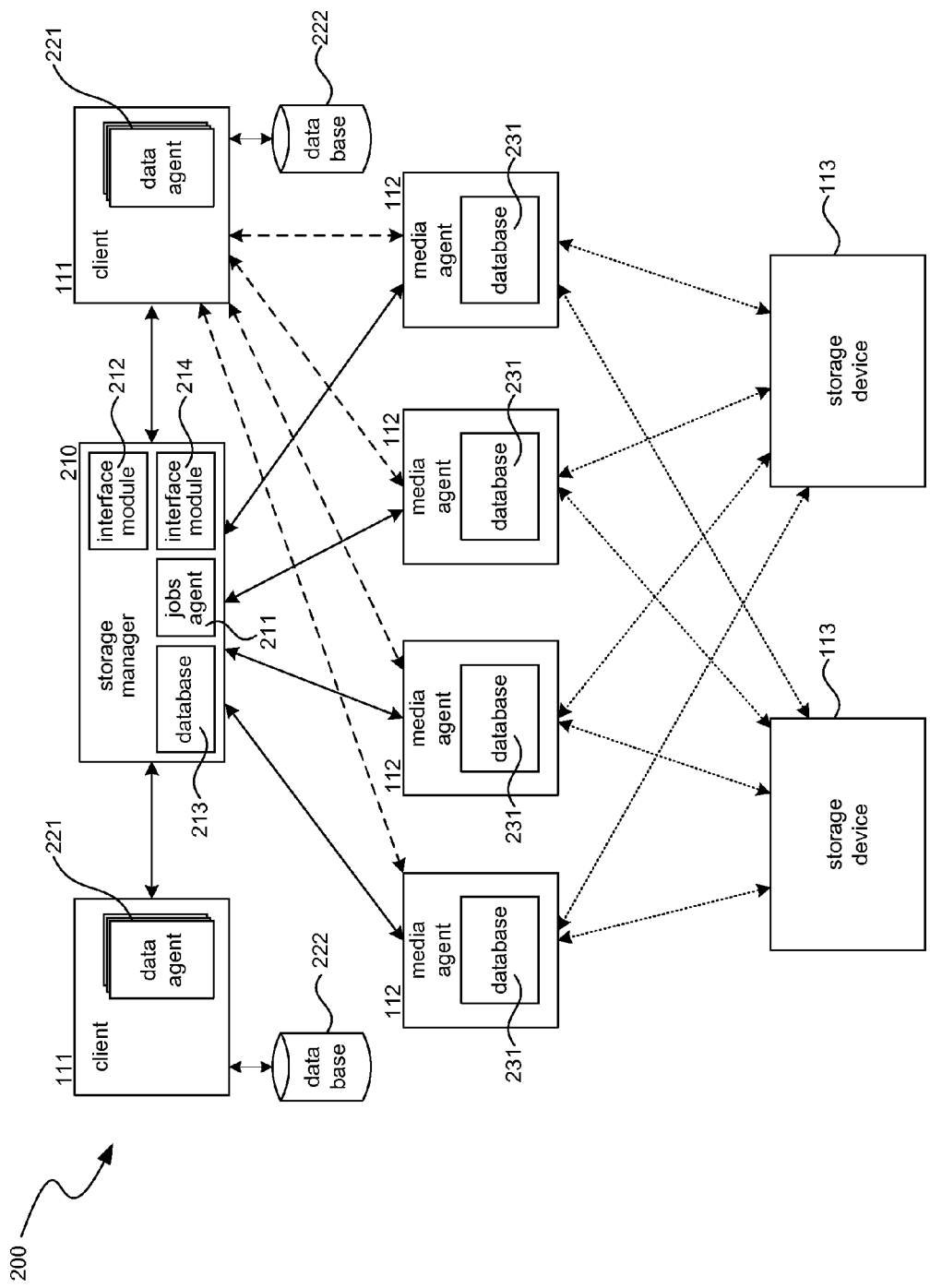
FIG. 2 is a block diagram illustrating an example of a data storage system.

Referring to FIG. 2, a block diagram illustrating an example of a data storage and recovery system 200 is shown. Data storage systems may contain some or all of the following components, depending on the needs of the system. FIG. 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other tangible or physical data storage media. In some aspects of the system, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

The data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that include information associated with the storage of data into secondary storage devices, for example.

The data storage and recovery system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. Additionally, some resources may create indices and other tables relied upon by the data storage system and other data recovery systems. The secondary copies may include snapshot copies and associated indices, but may also include other backup copies such as HSM copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
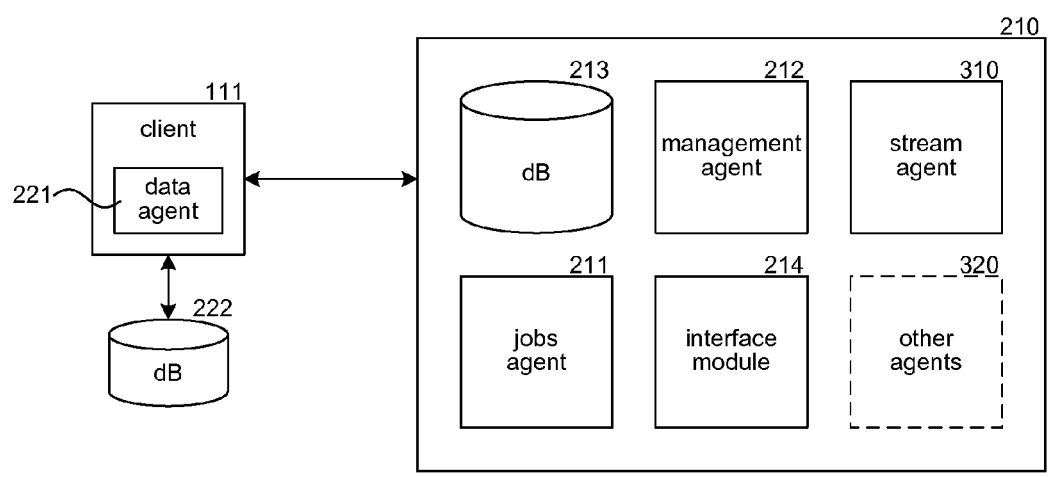
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to storage media. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

Data Recovery Using an Intermediary

In some examples, the system performs some or all the operations described herein using an intermediate component, virtual storage device, virtual device drover, or other intermediary capable of mounting to a file system and communicating with a storage device. That is, an intermediate component may communicatively reside between a component that receives requests for files (such as a restoration component) and a data store (such as a data storage component). The intermediate component enables flexibility during data restoration, enabling a file system to indirectly access a secondary copy of data in order to identify information associated with data stored by the secondary copy, among other benefits.

Figure 4A:
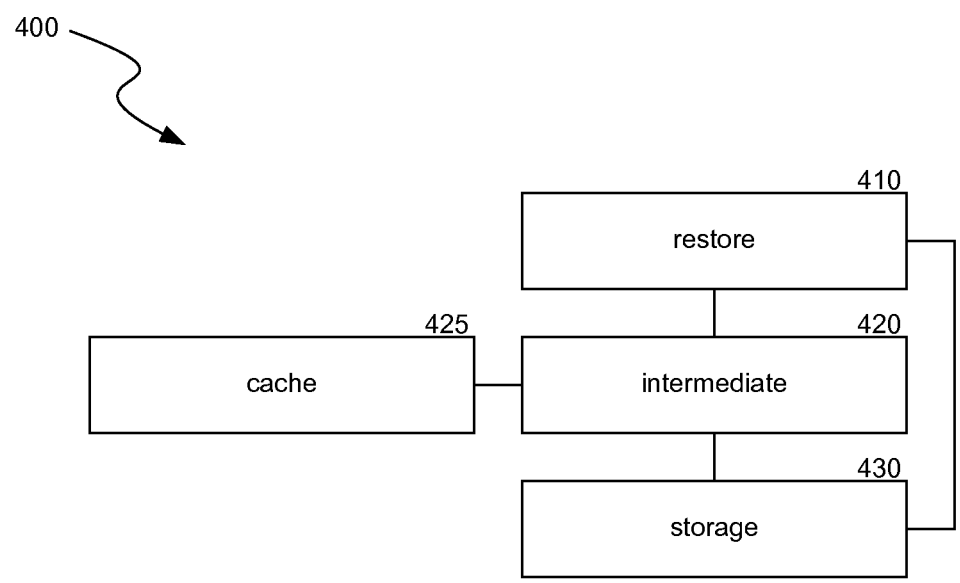
FIG. 4A is a block diagram illustrating a system for restoring data from a snapshot-based secondary copy of data.

Referring to FIG. 4A, a block diagram illustrating a system for restoring data 400 from a snapshot-based secondary copy of data is shown. The system 400 includes a restore component 410 that receives data recovery requests from users, such as from system administrators. The restore component 410 may include a file system that receives and sends requests, and a display component that includes a user interface that enables users to visually interact with the restore component. Among other things, the user interface may facilitate the selection of data, such as files, folders, or other self-contained data objects to be restored.

The restore component 410 sends data recovery requests to an intermediate component 420, to be discussed herein. Briefly, the intermediate component 420 acts to receive requests from the restore component 410 and to provide location information for requested data. The intermediate component 420 communicates with a storage component 430, such as storage media containing secondary copies of a data set. The storage component receives requests for files or folders via the intermediate component, and may transfer the files or folders (or information associated with the files or folders) to the intermediate component 420 or to the restore component 410.

The system 400 may also include an optional cache 425 associated with the intermediate component 420. The cache, or other memory component, may store files or information retrieved from the storage component 430, such as files or information requested by the restore component 410 via the intermediate component 420. The cache 425 may serve requests for files or information included in the cache, to promptly respond to a request, such as a request for the same file that was recently and/or previously requested. Although the cache 425 is shown as being outside the intermediate component, other configurations are of course possible. For example, the cache may be included within the intermediate component, within the restore component 410, within the storage component 430, and so on. Additionally, some or all of the components may include a cache that stores various files or information retrieved during data recovery.

Figure 4B:
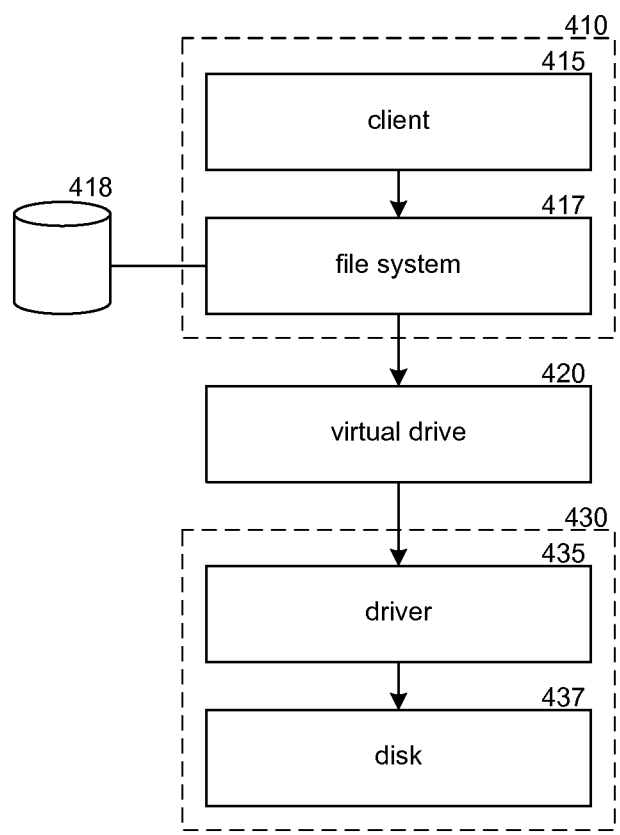
FIG. 4B is a block diagram illustrating computing system components for restoring data from a snapshot-based secondary copy of data.

Referring to FIG. 4B, a block diagram illustrating computing system components for restoring data from a snapshot-based secondary copy of data is shown. As discussed with respect to FIG. 4A, the system components include a restore component 410, an intermediate component 420, and a data storage component 430. The restore component 410 may include a client 415, such as a client that receives requests from users. The client may communicate received requests to a file system 417 that communicates with storage devices, such as a database 418 located at the restore component 410. For example, the database 418 may be a hard drive or hard disk that stores data produced by the file system as primary copies or production copies of the data. The system components may also include an intermediate component 420, such as a virtual device driver. The virtual device driver 420 communicates with a disk driver 435 and mounted disk 437, which together act as the data storage component 430.

Figure 5:
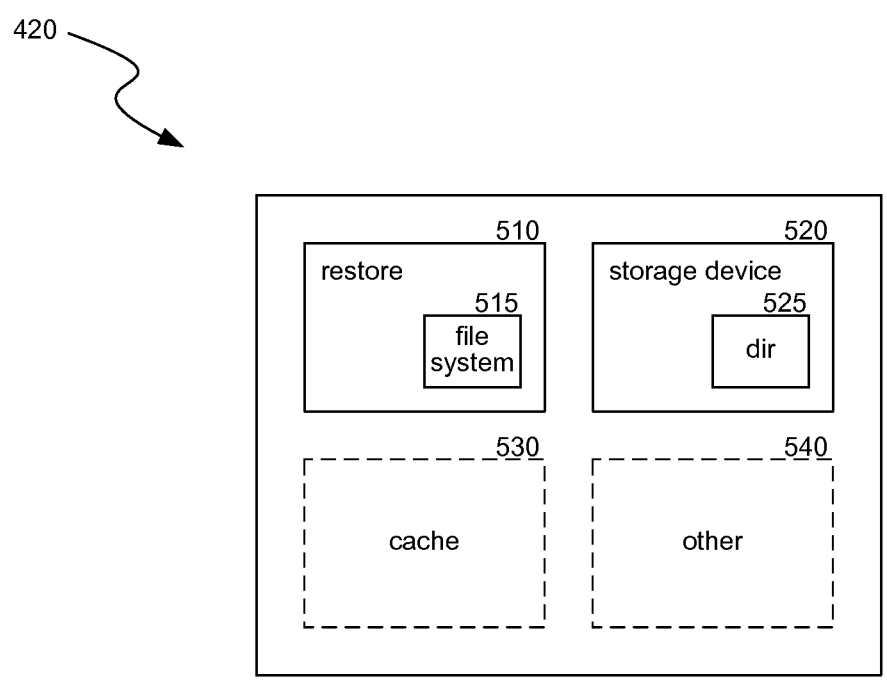
FIG. 5 is a block diagram illustrating an intermediate component used in restoring data from a snapshot-based secondary copy of data.

Referring to FIG. 5, a block diagram illustrating an intermediate component 420 used in restoring data from a snapshot-based secondary copy of data is shown. The intermediate component 420 may include a restore module 510 containing its own file system 515. The restore module 510 (or component, sub-system, and so on), may communicate with a file system, such as the file system 417 at the restore component 410.

The intermediate component 420 may also include a storage device module 520 that communicates with storage devices, such as disk driver 435 and disk 437 (or other removable media). The storage device module 520 may include a directory module 525 that accesses entries within directory files obtained from snapshot-based secondary copies and extracts information from the directory files, such as location information associated with files indexed by the directory files. In other words, to determine the location of files, the directory module identifies the specific disk or storage device maintaining a desired file and identifies the blocks on the disk that contain the file, such as by retrieving the directory, file allocation table (FAT), master file table (MFT), or other data structures that describe files and file locations on the disk.

The intermediate component 420 may also include a cache 530 (or, a cache module or interface that communicates with an external cache), and/or other agents or components 540, such as components that index files, classify files, manage files or information, and so on.

Figure 6:
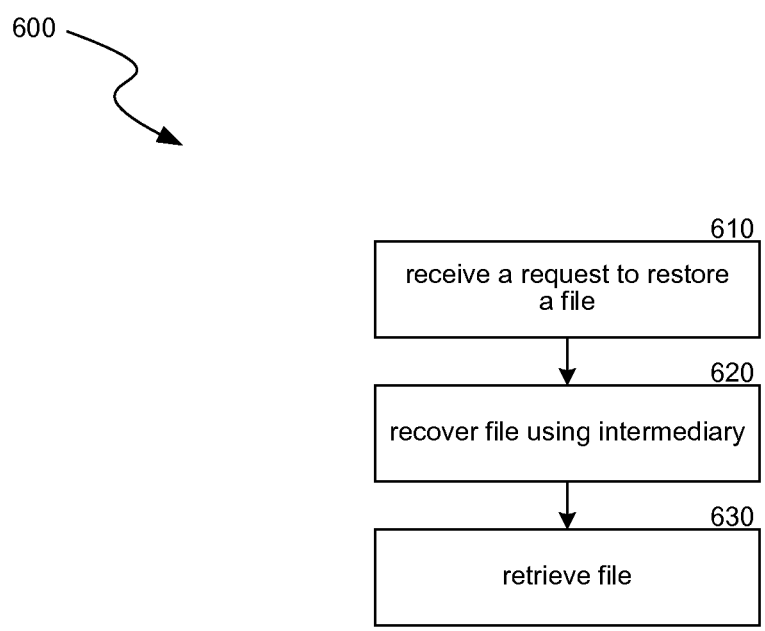
FIG. 6 is a flow diagram illustrating a routine for restoring a file using an intermediate component.

As discussed above, the system facilitates the recovery of files from snapshot-based secondary copies of data using an intermediary. Referring to FIG. 6, a flow diagram illustrating a routine 600 for restoring a file using an intermediate component is shown. In step 610, the system receives a request to restore a file. For example, the system receives the request via a user interface associated with a restore component 410. The request may present, via a graphical user interface, a list of files stored in secondary storage. For example, the system may present files currently stored on disk along with files no longer on disk but stored on secondary storage. The user or administrator may then select a desired file and/or files.

Alternatively or additionally, the request may include an indication of a snapshot (or group of snapshots) that contain an image of the file. The system may present snapshots (or groups of snapshots) to a user via the user interface, or information associated with the snapshots or groups of snapshots. For example, the system may present information identifying various snapshots taken of a file or of a data store that contained the file. In some cases, the restore component 410 presents, via the user interface, various groups of snapshots to a user for selection.

In step 620, the system recovers the file using an intermediary, such as the intermediate component 420. For example, the intermediary may receive the request, identify a location of the requested file, and provide the location to the requestor. By having previously mapped specific files with particular disks and/or storage devices, and with snapshots of the mapped storage devices, the system of FIG. 5 can readily locate the disk location and block extent of the desired file or files, as described herein. In step 630, the system retrieves the requested file from the identified location. For example, the restore component 410, using provided location information, directly accesses a data storage device and retrieves the file from the data storage device. That is, the system may access a directory file, identify data blocks that correspond to a requested file, and provide the data block identification to a file system. The file system may then directly access the file using the provided data block information.

Figure 7:
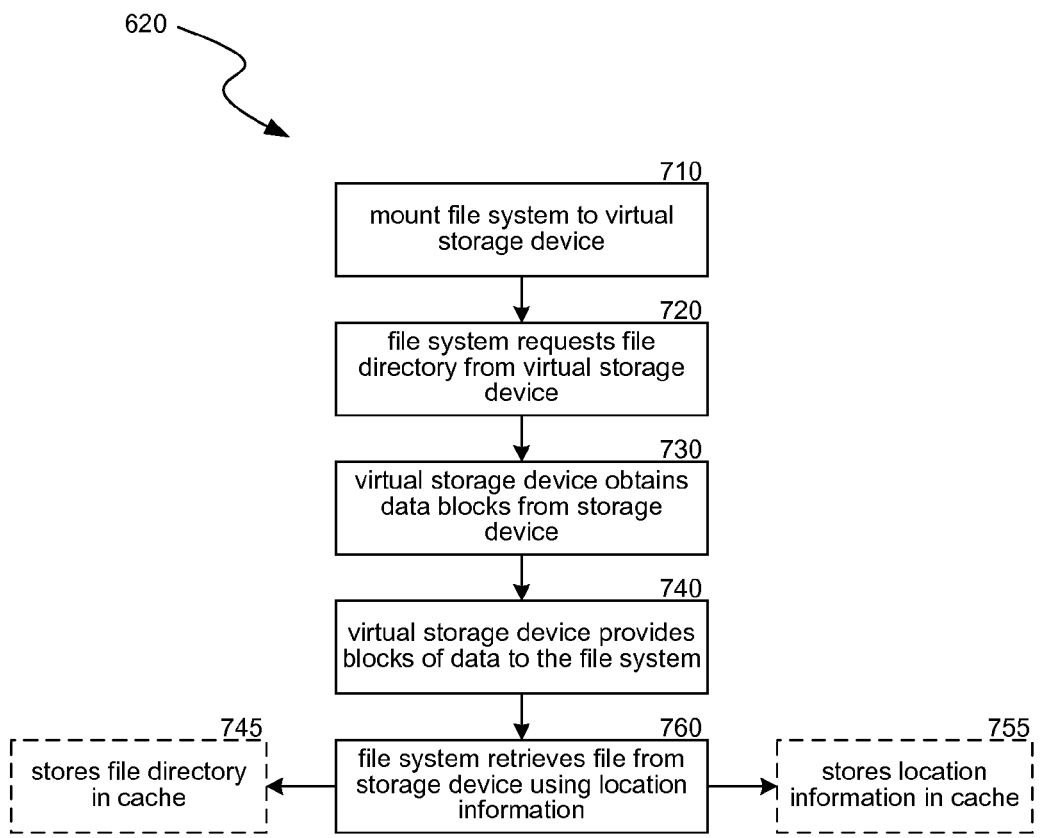
FIG. 7 is a flow diagram illustrating a routine for recovering a file via an intermediate component.

Thus, the intermediary, in some examples, intercepts requests for files from a file system in order to quickly and efficiently provide location information associated with the file to the file system. The file system, using the provided information, can then directly access and retrieve the file. The intermediary will now be discussed. Referring to FIG. 7, a flow diagram illustrating a routine 620 for recovering a file via the intermediate component 420 is shown.

In step 710, the system mounts the file system, or launches a file system process for accessing a file location data structure, to an intermediate component, such as a component that acts as a virtual storage device. That is, the file system communicates with a component that appears to external systems (such as file system 417) to be the disk driver 435 for reading and writing data from disk 437, but is in fact the intermediate component 420 communicating between the file system and the storage device.

In step 720, the file system requests a directory file from the storage device 430. That is, the file system requests an index or other table that is associated with and identifies the files within the storage device and the secondary copies contained within the storage device and locations of those files. In some cases, the directory file was created when a primary copy of the data was created, or was periodically created and/or updated from a primary volume. For snapshot-based copies, the directory file may be imaged by a snapshot along with the files imaged by the snapshot.

Figure 8:
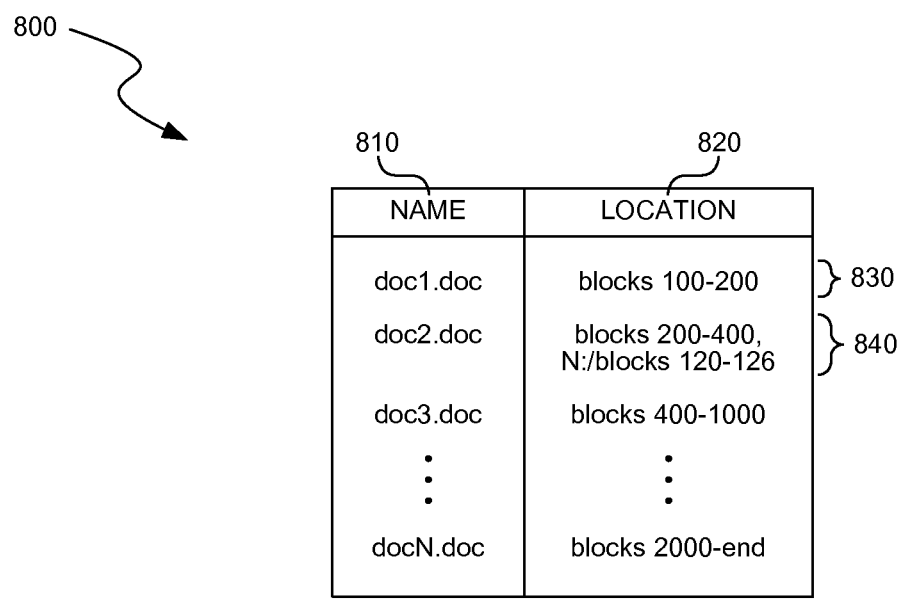
FIG. 8 is a table illustrating a directory file used in identifying locations of files imaged by snapshots.

Referring to FIG. 8, a table 800 illustrating a directory file used in identifying locations of files imaged by snapshots is shown. The table 800 includes entries for files imaged by the snapshot, and includes a column storing a name or other similar information 810 for each entry a column storing a location 820 or other similar information for each entry. For example, the entry 830 contains a file named "doc1.doc" and information associated with the file, "blocks 100-200." In addition, entry 840 contains a file named "doc2.doc" and information associated with the file, "blocks 200-400" and "N:/blocks 120-126" (e.g., the file is stored in multiple locations). Of course, the table 800 may include other information.

Referring back to FIG. 7, in step 730, the virtual storage device obtains data blocks from the storage device. The virtual storage device may intercept or trap the request from step 720 and send a request to the storage device. The virtual storage device may extract some or all of the directory file and provide the necessary data blocks.

In step 740, the virtual storage device presents the obtained data blocks to the file system. Optionally, upon receiving a selection of a file by the file system, the virtual storage device sends a location of the selected file to the file system. That is, the virtual storage device reviews the extracted directory file, obtains location information (such as the blocks on a magnetic disk storing a file, the tape offsets on a tape storing the file, and so on), and provides the location information to the file system. In step 745, the virtual storage device may optionally store the obtained data blocks in an associated cache, to serve future requests for files in the directory, among other things In step 755, the virtual storage device may optionally store the provided location information, the file itself, and/or the directory file in the cache, as described above.

In step 760, the file system retrieves the file from the storage device using the location information provided by the virtual storage device and responds to the original request. Using the location information, the file system may directly mount to the storage device and retrieve the file at the provided location. Alternatively, the virtual storage device may retrieve the file from the storage device and present the file to the file system.

As an example, a user, via a user interface presented to the user at a client computer 415, selects one or more Microsoft® Exchange® mailboxes to restore. The Exchange mailbox includes one or more files and associated data objects (such as emails) currently stored at the client computer 415 (or in database 418) as well as files that have been stored in snapshot-based secondary copies and moved from the database 418. The system, however, is able to present all the files to the user via the user interface. For example, Windows Explorer, or a similar application, may query the database 418 and obtain files and/or associated data objects associated with the mailbox, and lists them for the user. In addition, Windows Explorer queries the data storage component 430 for files/data objects associated with the mailbox. This query is intercepted by the intermediate component, which retrieves a directory file associated with the data imaged by the snapshot-based secondary copies, and transfers the directory file to the user via the user interface. The user interface presents all retrieved files/data objects to the user, without the user performing any additional or different steps to receive information from the snapshot-based secondary copies.

When the user selects a file/data object stored in database 418, the system looks to a FAT, MFT, or other location table associated with the file system 417, identifies the blocks in the database that contain the file/data object, and retrieves the file/data object. However, when the user selects a file/data object no longer stored in database 418, the system performs one of the routines described herein, such as routine 700, via a restore component or other similar components described herein. For example, the file system 417 sends a request to the data storage component 430 in order to retrieve the file/data object. The request is intercepted by the intermediate component 420, which then locates the file/data object based on information in the directory file that associates the snapshot image of the file with the file's location (e.g., what physical storage media stores the file and where on that physical storage media it resides). The system then transfers the location information to the file system, which then retrieves the file/data object. Thus, the system facilitates the recovery of data for users without required a user or a file system to perform additional tasks or functions when the data is not stored at the file system.

Of course, the routines and examples described herein with some of the steps omitted or modified. For example, a virtual storage device may receive a request for a file and only provide location information for the file (and not the directory file). Additionally, the virtual storage device may first look to the cache before retrieving a directory file, which will now be discussed.

Figure 9:
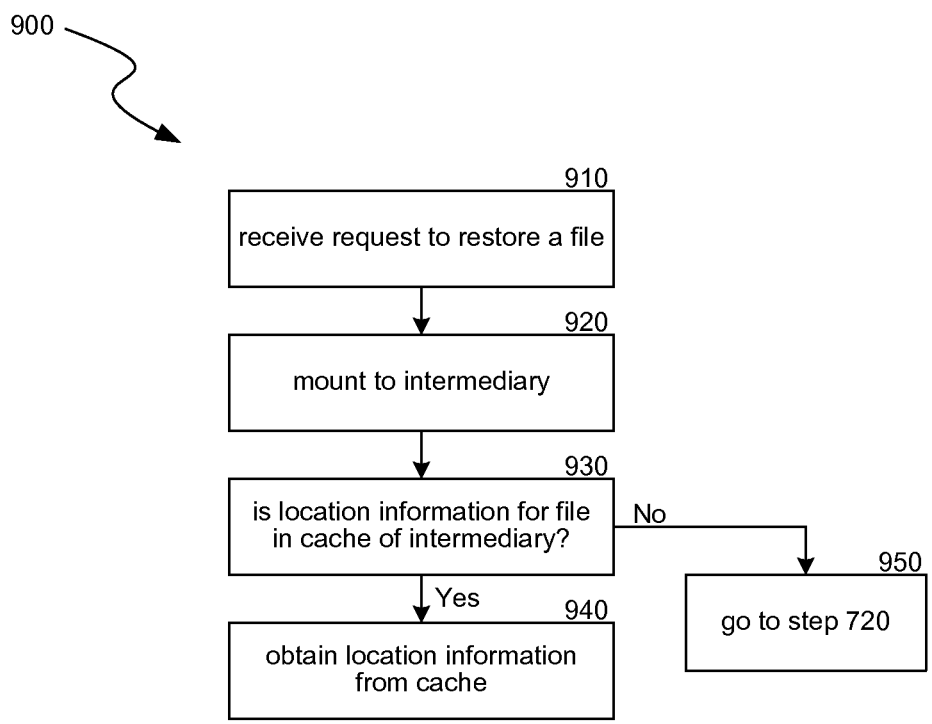
FIG. 9 is a flow diagram illustrating a routine for restoring a file using a cache associated with an intermediate component.

Referring to FIG. 9, a flow diagram illustrating a routine 900 for restoring a file using a cache associated with an intermediate component is shown. In step 910, a file system receives a request to restore a file. In step 920, the file system mounts to an intermediate component, which includes a cache or other memory component. In step 930, the intermediate component reviews the cache to determine if the cache contains the file, information associated with the file (such as location information), or a directory file that indexes the file.

If the cache includes information associated with the file, or the file itself, the system, in step 940, restores the file using the cached information. If the cache does not include any information, routine 900 proceeds to step 720 of FIG. 7, and the intermediate component obtains a directory file from a snapshot to identify the location of the file, as discussed herein.

Therefore, in some cases, utilizing an intermediate component enables the system to use previously recovered information to restore data. This can save time and resources, among other benefits.

Conclusion

From the foregoing, it will be appreciated that specific examples of the data recovery system have been described herein for purposes of illustration, but that various modifications may be made without deviating from the spirit and scope of the system. For example, although files have been described, other types of content such as user settings, application data, emails, and other data objects can be imaged by snapshots. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above.

The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

I claim:

1. A method in a computing system for restoring an individual file from a snapshot of a primary copy of a data set, the method comprising:
   receiving at a file system a request to restore files from a snapshot of a primary copy of a data set,
      wherein the snapshot indicates which files are included in the data set at a certain point in time,
      wherein at least some of the data set is stored as a secondary copy that differs from the primary copy, and
      wherein the secondary copy resides in a storage device that differs from another storage device storing the primary copy of the data set;
   transmitting from the file system to an intermediate component a request for a directory file that contains information associated with files imaged by the snapshot,
      wherein the directory file includes information identifying the files imaged by the snapshot and information identifying locations of the files imaged by the snapshot in the secondary copy;
   redirecting the request for the directory file from the intermediate component to the storage device,
      wherein the redirected request includes location information for the directory file;
   transmitting the directory file from the storage device to the intermediate component;
   storing the received directory file in a cache associated with the intermediate component;
   communicating information associated with files contained within the directory file from the intermediate component to the file system;
   transmitting a selection of a file to be restored to the intermediate component;
   transferring location information for the file from the intermediate component to the file system, wherein the location information is obtained from the directory file;
transmitting a request for the file using the transferred location information from the file system to the storage device, and
serving a subsequent request to restore files using the directory file stored in the cache associated with the intermediate component.

2. The method of claim 1, wherein the transferred location information includes an identification of data blocks on the storage device.

3. The method of claim 1, wherein redirecting the request includes:
at the intermediate component, retrieving a location for the directory file.

4. An intermediate component communicatively located between a restore component and a storage device, the intermediate component comprising:
a memory storing computer-executable instructions of:
a directory request module configured for the intermediate component to:
receive a request from the restore component for restoring files from a snapshot of a primary copy of a data set,
wherein the snapshot indicates which files are included in the data set at a certain point in time,
wherein at least some of the data set corresponding to the snapshot is stored as a secondary copy that differs from the primary copy, and
wherein the secondary copy resides in the storage device that differs from another device storing the primary copy of the data set; and
transmit a request to the storage device for a directory that includes information about files imaged by the snapshot;
a location information retrieval module configured for the intermediate component to:
receive the directory from the storage device;
present information regarding files included in the directory to the restore component; and
transfer location information to the restore component for a file selected by the restore component, wherein the location information is contained within the received directory; and
a cache module configured for the intermediate component to:
store the received directory or the location information for a predetermined time period after the request for restoring files was received; and
provide the received directory or the location information stored in the cache module in response a subsequent request for restoring files; and
a processor for executing the computer-executable instructions stored in the memory.

5. An intermediate component communicatively located between a restore component and a removable media for restoring an individual file from an image level copy of a primary copy of a data set, comprising:
means for receiving a request to restore files from an image level copy of a primary copy of a data set;
wherein the image level COPY indicates which files are included in the data set at a certain point in time,
wherein at least some of the data set corresponding to the image level copy is stored as a secondary copy that differs from the primary copy, and
wherein the secondary copy resides in the removable media that differs from another storage device storing the primary copy of the data set;
means for requesting a directory file from the secondary copy, wherein the directory file contains information identifying locations of the files imaged by the image level copy and included in the secondary copy;
means for receiving and redirecting the request for the directory file to the removable media, wherein the redirected request includes location information for the directory file obtained from the image level copy;
means for receiving the directory file and storing the received directory file in a cache;
means for communicating information associated with files contained within the directory file to the restore component;
means for receiving a selection of the file to be restored;
means for transferring location information for the file to the restore component receiving a selection of the file, wherein the location information for the file is obtained from the directory file; and
means for serving at least one subsequent request to restore files using the directory file stored in the cache.

6. The intermediate component of claim 5, wherein the means for displaying files includes:
means for displaying files tracked by the directory file; and
means for displaying files tracked by a file allocation table associated with the primary copy of the data set.

7. A non-transitory computer-readable storage medium containing code, which when executed by a computer causes an intermediate component communicatively located between a restore component and a storage device to perform a method, the method comprising:
receiving a request from the restore component for restoring files from a snapshot of a primary copy of a data set,
wherein the snapshot indicates which files are included in the data set at a certain point in time,
wherein at least some of the data set corresponding to the snapshot is stored as a secondary copy that differs from the primary copy, and
wherein the secondary copy resides in the storage device that differs from another device storing the primary copy of the data set;
transmitting a request to the storage device for a directory that includes information about files imaged by the snapshot;
receiving the directory from the storage device;
presenting information regarding files included in the directory to the restore component;
transferring location information to the restore component for a file selected by the restore component,
wherein the location information is contained within the received directory;
storing the received directory or the location information in a cache for a predetermined time period after the request for restoring files was received; and
providing the received directory or the location information stored in the cache module in response a subsequent request for restoring files.

8. A method performed by an intermediate component communicatively located between a restore component and a removable media to restore an individual file from an image level copy of a primary copy of a data set, the method comprising:
receiving a request to restore files from an image level copy of a primary copy of a data set, wherein the image level copy indicates which files are included in the data set at a certain point in time, wherein at least some of the data set corresponding to the image level copy is stored as a secondary copy that differs from the primary copy, and wherein the secondary copy resides in the removable media that differs from another storage device storing the primary copy of the data set;

requesting a directory file from the secondary copy, wherein the directory file contains information identifying locations of the files imaged by the image level copy and included in the secondary copy;

receiving and redirecting the request for the directory file to the removable media, wherein the redirected request includes location information for the directory file obtained from the image level copy;

receiving the directory file and storing the received directory file in a cache;

communicating information associated with files contained within the directory file to the restore component;

receiving a selection of the file to be restored;

transferring location information for the file to the restore component receiving a selection of the file, wherein the location information for the file is obtained from the directory file; and serving at least one subsequent request to restore files using the directory file stored in the cache.

* * * * *

UNITED STATES PATENT AND TRADEMARK OFFICE
CERTIFICATE OF CORRECTION

PATENT NO.         : 8,725,688 B2
APPLICATION NO.    : 12/553145
DATED              : May 13, 2014
INVENTOR(S)        : Kamleshkumar K. Lad It is certified that error appears in the above-identified patent and that said Letters Patent is hereby corrected as shown below:

On title page 4, in column 2, item 56 under "Other Publications", line 6, delete "amd" and insert -- and --, therefor.

In the Specification

In column 5, line 18, delete "drover," and insert -- driver, --, therefor.

In the Claims

In column 10, line 40, in claim 1, delete "set is" and insert -- set corresponding to the snapshot is --, therefor.

In column 11, line 63, in claim 5, delete "COPY" and insert -- copy --, therefor.

Signed and Sealed this
Fourteenth Day of October, 2014

Michelle K. Lee
*Deputy Director of the United States Patent and Trademark Office*